United States Patent [19]

Hatakeyama et al.

[11] Patent Number: 4,744,500
[45] Date of Patent: May 17, 1988

[54] VEHICLE ASSEMBLY SYSTEM

[75] Inventors: Mitunori Hatakeyama; Mitsugi Taniguchi, both of Hiroshima, Japan

[73] Assignee: Mazda Motor Corporation, Hiroshima, Japan

[21] Appl. No.: 5,643

[22] Filed: Jan. 21, 1987

[30] Foreign Application Priority Data

Jan. 22, 1986 [JP] Japan .................................. 61-11654

[51] Int. Cl.⁴ ............................................ B23K 37/00
[52] U.S. Cl. ...................................... 228/4.1; 228/47; 901/7
[58] Field of Search ...................... 228/4.1, 47; 901/6, 901/7; 219/79

[56] References Cited

U.S. PATENT DOCUMENTS

| 4,046,263 | 3/1977 | Cwycyshyn et al. | 901/7 |
| 4,359,815 | 11/1982 | Toyoda | 901/7 |
| 4,548,346 | 10/1985 | Kraus et al. | 228/47 |
| 4,573,626 | 3/1986 | Nishiyama | 228/47 |
| 4,611,749 | 9/1986 | Kawano | 228/47 |

FOREIGN PATENT DOCUMENTS

| 138412 | 10/1979 | Fed. Rep. of Germany | 901/6 |
| 53-21542 | 2/1978 | Japan | 228/47 |

Primary Examiner—Nicholas P. Godici
Assistant Examiner—Samuel M. Heinrich
Attorney, Agent, or Firm—Gerald J. Ferguson, Jr.; Michael P. Hoffman; Michael J. Foycik, Jr.

[57] ABSTRACT

A plurality of vehicle bodies are successively conveyed with the rear of each vehicle body directed in the conveying direction and the front of each vehicle body opposed to the rear of the immediately rearward vehicle body. A single robot mounts a first part on the front of each vehicle body and a second part on the rear of the immediately rearward vehicle body.

11 Claims, 6 Drawing Sheets

VEHICLE ASSEMBLY SYSTEM

BACKGROUND OF THE INVENTION

1. Field of the Invention

This invention relates to a vehicle assembly system for mounting a plurality of parts on a vehicle body.

2. Description of the Prior Art

There has been known a vehicle assembly system in which various parts to be mounted on a vehicle body are conveyed by a conveyor means and are mounted on the vehicle body at predetermined portions. (See Japanese Pat. Publication No. 53(1978)-21542, for example.) In such a vehicle assembly system, the conveyor means is controlled to hold the parts set on jigs and to supply the parts along predetermined loci at predetermined times to the vehicle bodies successively conveyed and to mount the parts on the vehicle bodies at predetermined portions.

SUMMARY OF THE INVENTION

The primary object of the present invention is to provide a vehicle assembly system in which a plurality of parts can be mounted on a vehicle body with a higher efficiency.

The vehicle assembly system in accordance with the present invention is characterized in that, while a plurality of vehicle bodies are successively conveyed in the same orientation with one of the front and rear of each vehicle body being opposed to the other of the immediately rearward vehicle body, a single robot mounts a first part on said one of the front and rear of each vehicle body and a second part on said the other of the immediately rearward vehicle body.

For example, a plurality of vehicle bodies are successively conveyed with the front of each vehicle body directed in the conveying direction and the rear of each vehicle body opposed to the front of the next or the immediately rearward vehicle body. A single robot mounts a first part (a part to be mounted on the rear of the vehicle body) on the rear of each vehicle body and a second part (a part to be mounted on the front of the vehicle body) on the front of the immediately rearward vehicle body. When the vehicle bodies are conveyed with the rear of each vehicle body directed in the conveying direction, the first part is a part to be mounted on the front of the vehicle body and the second part is a part to be mounted on the rear of the vehicle body.

DESCRIPTION OF THE PREFERRED EMBODIMENT

Figure 1:
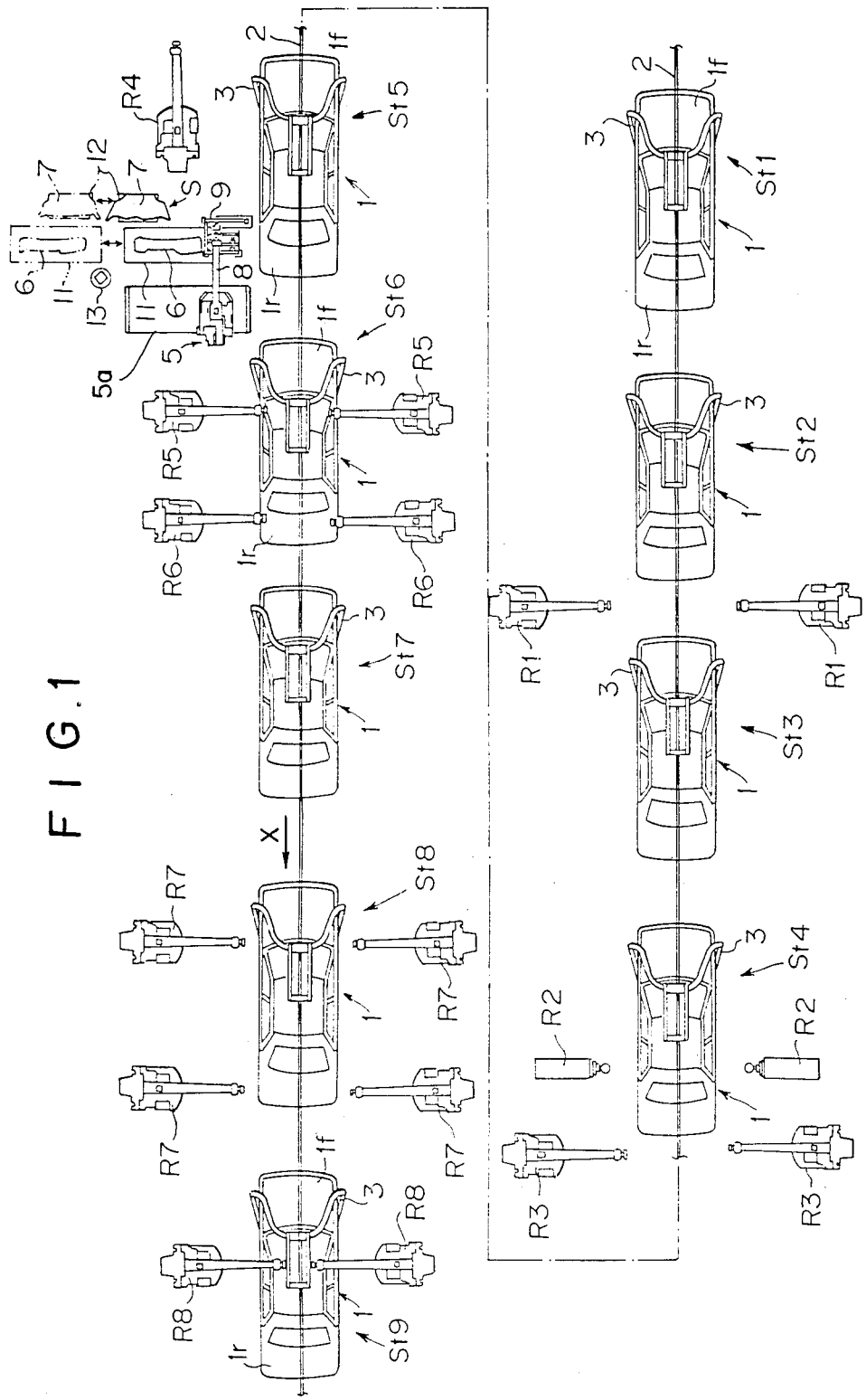
FIG. 1 is a schematic view of a vehicle assembly system in accordance with an embodiment of the present invention.

In FIG. 1, $St_1$ denotes a first station for supplying underbodies transferred from an underbody subassembly line to a second station $St_2$. The underbody panels are supplied to the second station $St_2$ in synchronization with cabside panels which are supplied to the second station $St_2$ by a drop lifter (not shown) from above. Robots $R_1$ disposed in the second station $St_2$ remove, using a handling jig, the cabside panels from the drop lifter, locate them and feed them to setters (not shown). Then the handling jig is removed from the each robot $R_1$ and a welding gun is chucked to each robot $R_1$. The robots $R_1$ weld the cabside panels and the underbody panel located by the setters to a vehicle body 1. Then the vehicle body 1 is conveyed to a third station $St_3$ by a shuttle type conveyor. At the third station $St_3$, the vehicle body 1 is transferred to an overhead conveyor 2 having automatic traveling type hangers 3 which will be described in detail later. Each hanger 3 is lowered from above the third station $St_3$ and is located in place, and thereafter the vehicle body 1 conveyed by the shuttle type conveyor from the second station $St_2$ is transferred to the hanger 3. The overhead conveyor 2 conveys the vehicle body 1 in an indexing fashion to a fourth station $St_4$. At the fourth station $St_4$, welding robots $R_2$ weld welding areas on the lower side of the vehicle body 1, and welding robots $R_3$ weld welding areas related to the tire houses. At a fifth station $St_5$, a material handling robot $R_4$ holds a roof located in place and places the roof on the vehicle body 1. At the same time, a cabside retainer (not shown) locates the cabside panels to adjust the inclination and flare of the cabside panels in the transverse direction of the vehicle body 1. At a sixth station $St_6$, welding robots $R_5$ weld the roof and a dashboard upper panel and welding robots $R_6$ weld the roof and a rear end panel. As will be described in detail later, a robot 5 is disposed between the fifth and sixth stations $St_5$ and $St_6$ and supplies a package tray 7 to the vehicle body 1 resting at the fifth station $St_5$ and the dashboard upper panel 6 to the vehicle body 1 resting at the sixth station $St_6$. Supply of the dashboard upper panel 6 to the vehicle body 1 at the sixth station $St_6$ is effected before the welding by the welding robots $R_5$ and $R_6$. At a seventh station $St_7$, small parts are manually welded to the vehicle body. At an eighth station $St_8$, welding robots $R_7$ effect welding for reinforcement of the rain rail portion of the roof. At a ninth station, weldings in the passenger compartment such as welding areas related to the front pillar portion, package tray and the like are effected by welding robots $R_8$.

The operation of the robot 5 disposed between the fifth and sixth stations $St_5$ and $St_6$ will be described in detail, hereinbelow.

In this particular embodiment, the vehicle bodies 1 are conveyed through the fifth and sixth stations $St_5$ and $St_6$ by the overhead conveyor 2 in the direction of arrow X in FIG. 1 with the rear side $1r$ of each vehicle body 1 being directed forward, i.e. in the conveying direction X. That is, the front side $1f$ of each vehicle body 1 is opposed to the rear side $1r$ of the next vehicle body 1 while the vehicle bodies 1 are conveyed. The robot 5 disposed between the fifth and sixth stations $St_5$ and $St_6$ mounts a front side part (the dashboard upper panel 6 in this particular embodiment) on the front side $1f$ of the forward vehicle body 1 and a rear side part (the package tray 7 in this particular embodiment) on the rear side 1r of the rearward vehicle body 1 while the forward fifth stations St₆ and St₅. The robot 5 is slidable away and toward the overhead conveyor 2 along a slide base 5a and is swingable about the base thereof. The robot 5 holds the dashboard upper panel 6 and the package tray 7 by way of a material handling jig 9 on the free end of its arm 8 at a part setting position S, and first mounts the dashboard upper panel 6 on the front side 1f of the vehicle body 1 at the sixth station St₆ and then mounts the package tray 7 on the rear side 1r of the vehicle body 1 at the fifth station St₅. The dashboard upper panel 6 and the package tray 7 are respectively supplied to the part setting position S by a front side part supply device 11 and a rear side part supply device 12. In this particular embodiment, the robot 5 further performs welding on the dashboard upper panel 6, and a welding gun (not shown) is mounted on or demounted from the arm 8 of the robot 5 at a welding gun mounting table 13.

Figure 2:
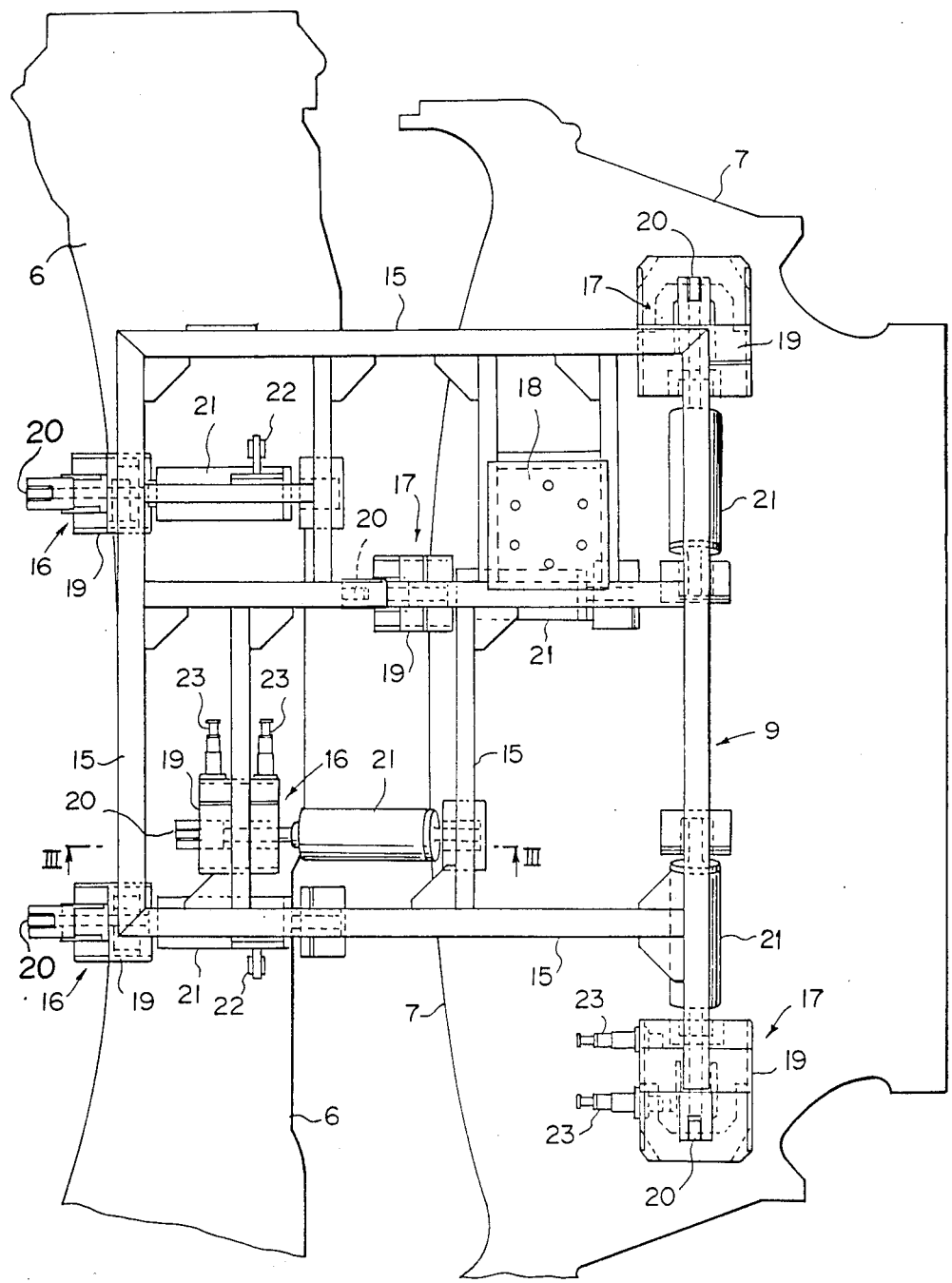
FIG. 2 is a plan view of the material handling jig employed in the vehicle assembly system.

As shown in FIG. 2, the material handling jig 9 includes a substantially rectangular frame 15, three clamp mechanisms 16 mounted of the left side part of the frame 15 and three clamp mechanisms 17 mounted on the right side part of the same. The clamp mechanisms 16 are for holding the dashboard upper panel 6 and the clamp mechanisms 17 are for holding the package tray 7. A support member 18 at which the robot 5 holds the jig 9 is provided at the portion where the center of gravity of the jig 9 falls when the parts 6 and 7 are held by the clamp mechanisms 16 and 17.

Figure 3:
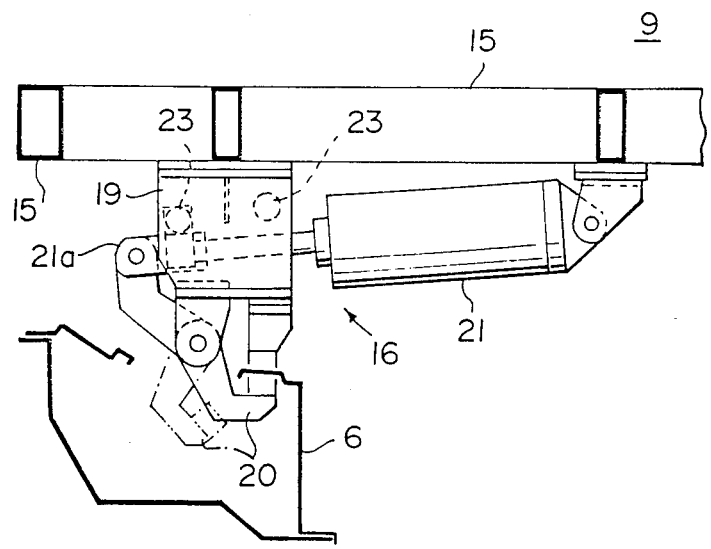
FIG. 3 is a cross-sectional view taken along line III—III in FIG. 2.

FIG. 3 shows one of the clamp mechanisms 16. The clamp mechanism 16 comprises a clamp hook 20 pivoted on the frame 15 by way of a bracket 19. A rod 21a of a clamp cylinder 21 is connected to the base end of the clamp hook 20 so that when the rod 21a is extended, the clamp hook 20 is swung to hold the dashboard upper panel 6 at an edge portion or the like. The other clamp mechanisms 16 and the clamp mechanisms 17 are of the substantially same structure though the shape of the clamp hook 20 varies slightly depending on the part to be clamped thereby.

The frame 15 is further provided with a pair of retainer members 22 which abut against the upper surface of the dashboard upper panel 6, and contactless switches 23 for checking the operation of the clamp mechanisms 16 and 17.

The clamp cylinders 21 are operated in response to operation of the robot 5 to cause the clamp hooks 20 to clamp the parts 6 and 7 at the part setting position S and to release the parts 6 and 7 at predetermined positions.

Figure 4:
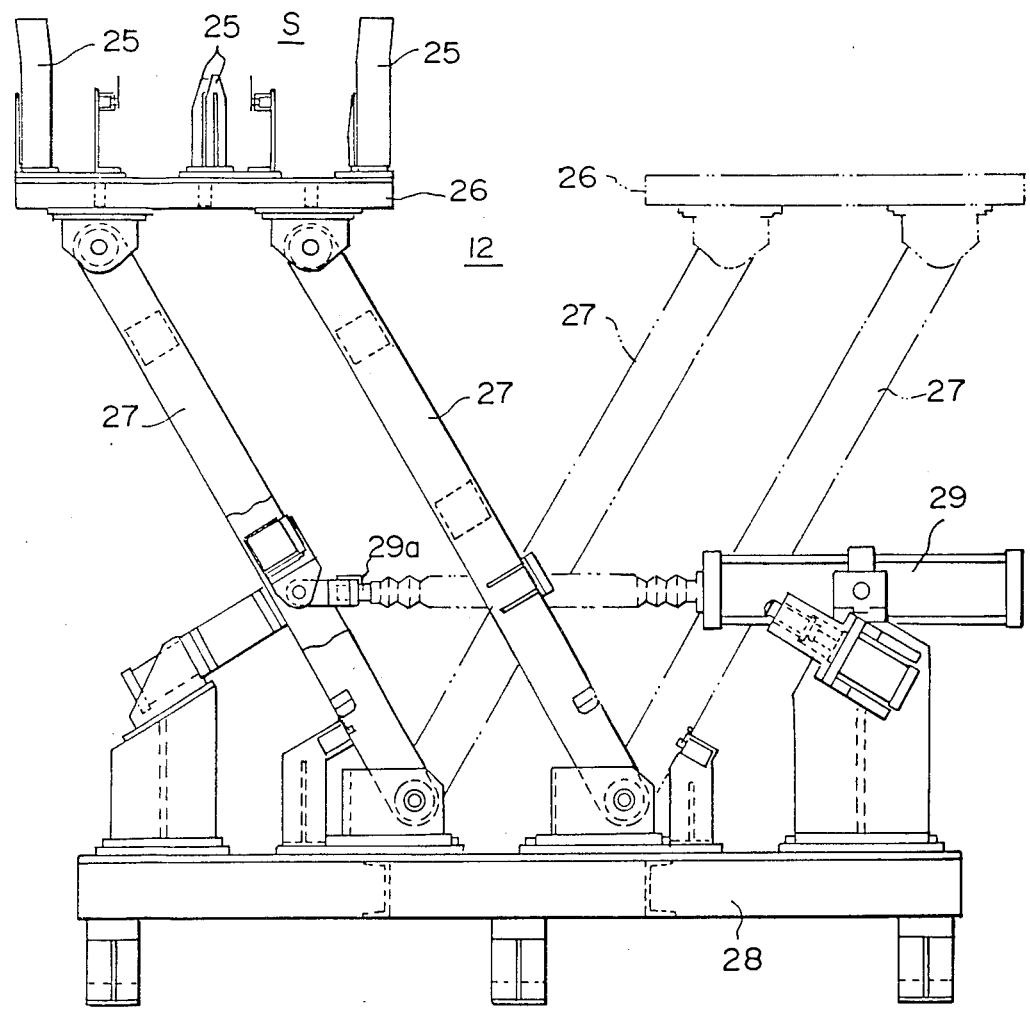
FIG. 4 is a front view showing one of the part supply devices employed in the vehicle assembly system.

As shown in FIG. 4, the rear side part supply device 12 comprises a conveyor table 26, a part locating jig 25 provided on the conveyor table 26 and a base 28 on which the conveyor table 26 is supported by way of a parallel link 27. A rod 29a of a conveyor cylinder 29 is connected to the parallel link 27 to move the conveyor table 26 between the part setting position S and a retracted position (shown by chained line) in which the part 7 is placed on the conveyor table 26. The front side part supply device 12 is of substantially the same structure.

When the parts 6 and 7 are set in the part setting position S, the robot 5 is slid along the slide base 5a to fetch the welding gun from the welding gun mounting table 13, and then the robot 5 tack-welds the dashboard upper panel 6 set in the part setting position S. After completion of tack-welding of the dashboard upper panel 6, the robot 5 returns the welding gun to the welding gun mounting table 13 and is slid to the material handling jig 9. Then the robot 5 is slid to the part setting position S with the material handling jig 9 and holds the dashboard upper panel 6 and the package tray 7 and is slid along the slide base 5a toward the vehicle bodies 1 to mount the parts 6 and 7 respectively on the forward vehicle body and the rearward vehicle body as described above.

Figure 5:
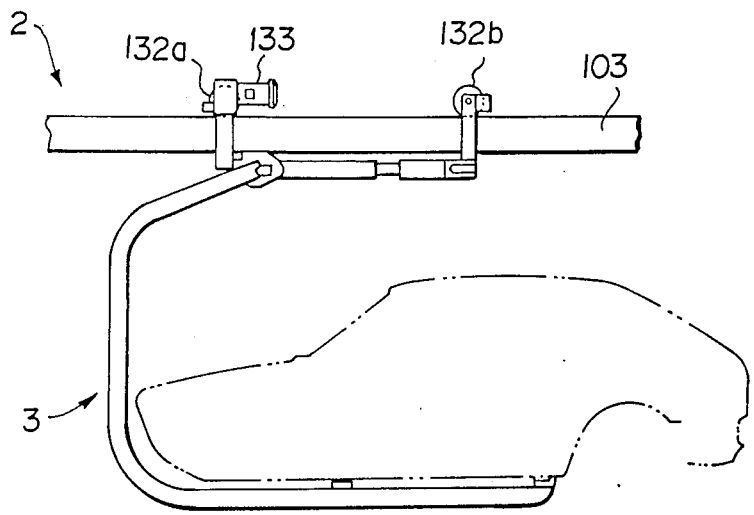
FIG. 5 is a side view showing in detail the conveyor system employed in the vehicle assembly system.
Figure 6:
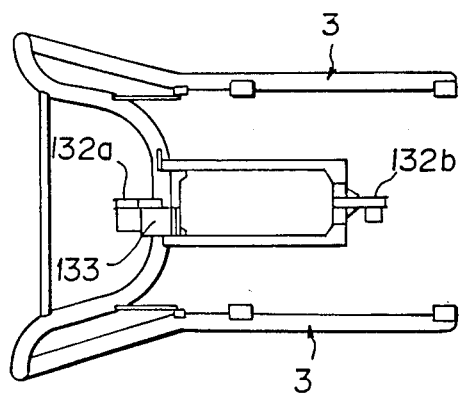
FIG. 6 is a plan view showing the conveyor system.
Figure 7:
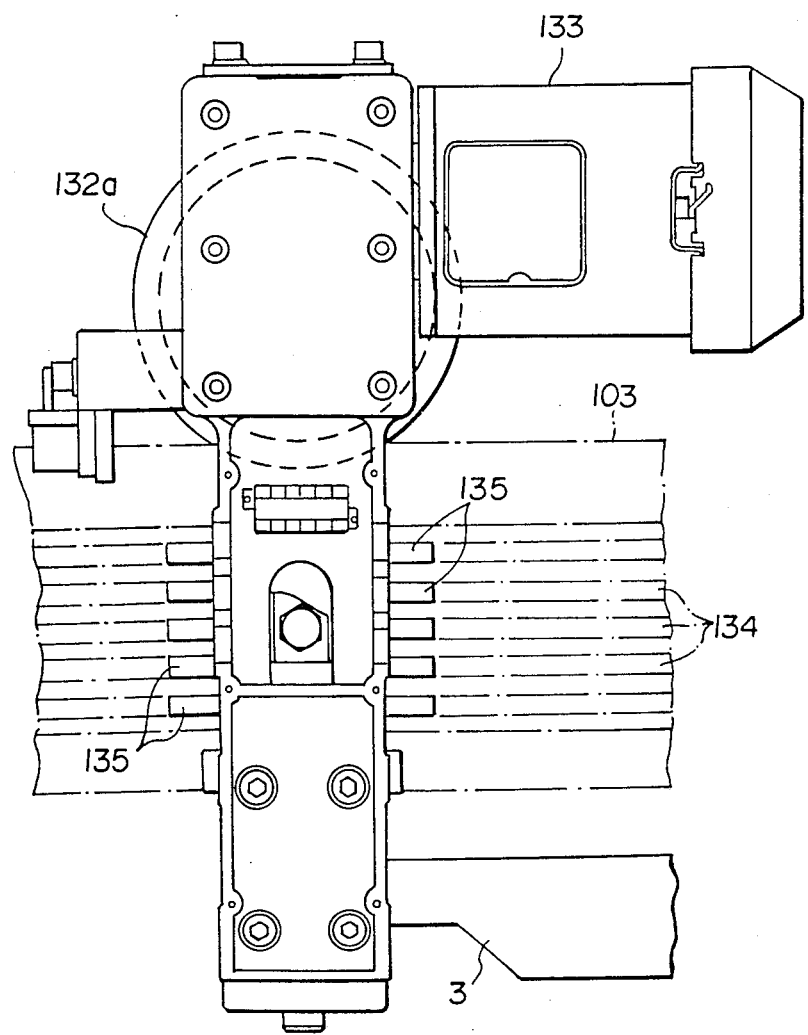
FIG. 7 is an enlarged fragmentary side view showing in detail a part of the conveyor system.

FIGS. 5 to 7 show in detail the overhead conveyor system 2. The hanger 3 of the conveyor system 2 in this particular embodiment is of an automatic traveling type. That is, a plurality of feeders 134 which are like grooves in shape are formed on one side of an overhead rail 103, and the hanger 3 is provided with a plurality of current collectors 135 which are slidable along the rail 103 while maintaining an electrical contact with the feeders 134. The hanger 3 is supported on the rail 103 by way of wheels 132a and 132b which are driven by a driving motor 133. The driving motor 133 drives the wheels 132a and 132b forward or rearward or stops the same according to a signal obtained by way of the current collectors 135. The feeders 134 are not continuous over the length of the rail 103, but are separated between adjacent stations so that the hanger 3 can be controlled in each station independently from the other stations.

Such an automatic traveling type hanger is advantageous over a chain driving type overhead conveyor in that since each hanger can be controlled independently from the other hangers, the spaces between adjacent stations can be freely determined and the hanger can be freely controlled in each station. In this particular embodiment, the space between the fifth and sixth stations St₅ and St₆ is arranged narrower than the spaces between the other stations so that the robot 5 can reach both the vehicle bodies respectively resting at the fifth and sixth stations St₅ and St₆.

In the embodiment described above, the vehicle bodies 1 are conveyed by the overhead conveyor 2 and the floor is free from conveyor means such as a conveyor rail, conveyor tables or the like. Accordingly, the robot 5 can be positioned in the vicinity of the vehicle bodies 1 whereby the length of the arm 8 can be shortened and the moving range of the robot 5 can be narrowed. This contributes to reduction of the space the has to be reserved for the robot 5.

Though in the embodiment described above, the robot holds both the parts 6 and 7 at the same time, the robot 5 may be arranged to hold and mount the parts 6 and 7 one by one.

We claim:

1. A vehicle assembly system in which a plurality of vehicle bodies are successively conveyed in the same orientation with one of the front and rear of each vehicle body being opposed to the other one of the front and rear of the immediately rearward vehicle body, comprising a single robot means for mounting (a) a first part on a leading one of the vehicles, and (b) a second part on the immediately rearward vehicle body; said single robot means being pivotable;
an overhead conveyor means;
an automatic traveling hanger means for independently controllable traveling along said overhead conveyor means;
a plurality of working stations, said automatic traveling conveyor traveling through each of said plurality of working station;

said single robot means being disposed in the vicinity of said overhead conveyor and in the vicinity of two predetermined ones of said plurality of working stations, said single robot means being capable of performing operations selectively at either one of said two predetermined working stations;

said two predetermined working stations being disposed within a swinging locus of an operating portion of said single robot means;

the space between said two predetermined working stations being smaller than a maximum space between other adjacent pairs of working stations.

2. A vehicle assembly system as defined in claim 1 in which said robot is disposed between a pair of working stations.

3. A vehicle assembly system as defined in claim 2 in which said vehicle bodies are conveyed to each working station in indexing feed fashion.

4. A vehicle assembly system as defined in claim 3 in which said vehicle bodies are conveyed by an overhead conveyor.

5. A vehicle assembly system as defined in claim 4 in which said robot is adapted to alternately hold a welding gun and a material handling jig for supplying a part to the vehicle body.

6. A vehicle assembly system as defined in claim 5 in which said material handling jig can simultaneously hold the first part and the second part.

7. A vehicle assembly system as defined in claim 5 in which said robot is mounted both for rotation and for sliding movement in a direction perpendicular to the direction in which the vehicle bodies are conveyed.

8. A vehicle assembly system as defined in claim 7 further comprising a part supply means which feeds said first and second parts to a part supply position which is in the working range of the robot to permit the robot to hold the parts.

9. A vehicle assembly system as defined in claim 8 in which said robot effects welding on at least one of the first and second parts positioned in the part supply position.

10. A vehicle assembly system in which a plurality of vehicle bodies are successively conveyed in the same orientation with one of the front and rear of each vehicle body being opposed to the other one of the front and rear of the immediately rearward vehicle body in a substantially straight portion of a vehicle assembly line, comprising a single robot for mounting (a) a first part on a leading one of the vehicles, and (b) a second part on the immediately rearward vehicle body; said single robot being pivotable;

an overhead conveyor means;

an automatic traveling hanger means for independently controllable traveling along said overhead conveyor means;

a plurality of working stations; said automatic traveling conveyor traveling through each of said plurality of working stations;

said single robot means being disposed in the vicinity of said overhead conveyor and in the vicinity of two predetermined ones of said plurality of working stations, said single robot means being capable or performing operations selectively at either one of said two predermined working stations;

said two predetermined working stations being disposed within a swinging locus of an operating portion of said single robot means.

11. A vehicle assembly system as claimed in claim 10, wherein the space between said two predetermined working stations being smaller than a maximum space between other adjacent pairs of working stations.

* * * * *